(12) United States Patent
Morche

(10) Patent No.: US 9,191,129 B2
(45) Date of Patent: Nov. 17, 2015

(54) METHOD FOR DETERMINING THE ARRIVAL TIME OF A UWB PULSE WITH A DOUBLE QUADRATURE RECEIVER

(71) Applicant: COMMISSARIAT A L'ENERGIE ATOMIQUE ET AUX ENE ALT, Paris (FR)

(72) Inventor: Dominique Morche, Meylan (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/164,868

(22) Filed: Jan. 27, 2014

(65) Prior Publication Data

US 2014/0204977 A1    Jul. 24, 2014

(30) Foreign Application Priority Data

Jan. 14, 2013  (FR) ...................... 13 50298

(51) Int. Cl.
*H04B 1/00*       (2006.01)
*H04B 17/00*      (2015.01)
*H04B 1/69*       (2011.01)
*H04B 1/7183*     (2011.01)
*H04B 1/7163*     (2011.01)

(52) U.S. Cl.
CPC .................. *H04B 17/00* (2013.01); *H04B 1/69* (2013.01); *H04B 1/7183* (2013.01); *H04B 1/71637* (2013.01); *H04B 2001/6908* (2013.01)

(58) Field of Classification Search
CPC ..... G01S 13/767; G01S 5/0205; G01S 11/02; G01S 13/76; H04B 1/71637; H04B 1/06; H04B 1/26

USPC .......................................................... 375/130
See application file for complete search history.

(56) References Cited

U.S. PATENT DOCUMENTS 7,227,346 B1    6/2007  Solbrig

FOREIGN PATENT DOCUMENTS

EP        1 580 901 A    9/2005

OTHER PUBLICATIONS

Bautista et al. "Antenna characteristics and ranging robustness with double quadrature receiver and UWB impulse radio." From Conference on Sep. 17-20, 2012. 2012 IEEE International Conference on Ultra-Wideband (ICUWB). Accessed on Dec. 27, 2014.*
French Preliminary Search Report issued Aug. 9, 2013 in Patent Application No. FR 1350298 (with English translation of Categories of Cited Documents).

(Continued)

*Primary Examiner* — Shuwang Liu
*Assistant Examiner* — David S Huang
(74) *Attorney, Agent, or Firm* — Oblon, McClelland, Maier & Neustadt, L.L.P.

(57) ABSTRACT

The invention relates to a method of estimating the time of arrival of a UWB pulse contained in an RF signal using a double quadrature receiver. The time of arrival is obtained from an estimate of the phase of the RF signal (($\phi_{RF}(\tau)$)) relative to the local oscillator signal in the first stage of the quadrature mix, and an estimate of the phase of the baseband signal (($\phi_{BB}(\tau)$)) relative to the first/second signal of the orthogonal base used in the second stage of the quadrature mix.

16 Claims, 5 Drawing Sheets

(56) References Cited

OTHER PUBLICATIONS

Farid Bautista, et al., "Low power beamforming RF architecture enabling fine ranging and AOA techniques" 2011 IEEE International Conference on Ultra-Wideband (ICUWB), XP032115737, Sep. 14, 2011, pp. 585-589.

Gilles Masson, et al., "A 1 nJ/b 3.2-to-4.7 GHz UWB 50 Mpulses/s Double Quadrature Receiver for Communication and Localization" Proceedings of the ESSCIRC 2010, Sep. 14-16, 2010, pp. 502-505.

* cited by examiner

METHOD FOR DETERMINING THE ARRIVAL TIME OF A UWB PULSE WITH A DOUBLE QUADRATURE RECEIVER

TECHNICAL DOMAIN

This invention relates to the domain of UWB (Ultra Wide Band) receivers. It concerns distance measurement systems using a UWB signal and also UWB telecommunication systems, particularly those that use pulse position modulation (PPM).

STATE OF PRIOR ART

Pulse type ultra wide band (UWB) telecommunication systems are well known to those skilled in the art. In such a system, a symbol emitted by an emitter is transmitted using a sequence of ultra-short pulses lasting the order of one nanosecond or about a hundred picoseconds.

FIG. 1 diagrammatically illustrates the signal emitted by a UWB emitter corresponding to a given information symbol. This signal is usually composed of pulses repeating with a repetition period $T_c$.

The signal emitted by the emitter in the absence of any modulation symbols can be expressed as follows:

$$s_{Tx}(t) = \sum_{k=0}^{L-1} (-1)^{\sigma_k} p(t - kT_c)\cos(2\pi f_0(t - kT_c) + \varphi_0) \quad (1)$$

where p(t) is the shape of the elementary baseband pulse, $f_0$ is the carrier frequency, $\phi_0$ is the phase at the origin, $T_c$ is the repetition period, and $\sigma=\sigma_0, \ldots, \sigma_{L-1}$ is a pseudo-random binary sequence. The duration τ of the elementary pulse p(t) is significantly less than the duration of the period $T_c$.

This base signal may be modulated in amplitude and/or in position to transmit a modulation symbol per frame composed of a given number of repetition periods. The frame duration is $T_f=LT_c$, where L is the number of periods in the frame. For example, if the modulation is a pulse position modulation (PPM), the modulated signal can be expressed in the following form:

$$s_{Tx}(t) = \sum_{k=0}^{L-1} (-1)^{\sigma_k} p(t - kT_c - m\varepsilon)\cos(2\pi f_0(t - kT_c - m\varepsilon) + \varphi_0) \quad (2)$$

where ε is a modulation delay significantly less than the period $T_c$ and m=0, ..., M−1 gives the value of the PPM symbol, in other words its time position. In this case the PPM modulation alphabet is composed of δ(t−mε), where m=0, ..., M−1 where δ is the Dirac symbol.

The receiver of a UWB signal modulated by PPM modulation must precisely determine the time of arrival of each received pulse, because the signal carries the modulation information.

Furthermore, the very short pulse duration of pulse UWB signals makes signals excellent candidates for measuring distances and for radiolocalising. Regardless of the principle of the envisaged distance measurement system (for example forward return propagation time) or radiolocalising system (for example difference in propagation time), it is essential to be able to precisely determine the time of arrival of a UWB pulse.

A first method of determining the time of arrival of a UWB pulse consists of making an integration of the received signal, after translation into baseband, in a plurality of consecutive time windows.

FIG. 2 describes a UWB receiver 200, used by this time of arrival determination method.

It comprises a frequency conversion stage to translate the signal into baseband 210 followed by a low pass filter stage 215 and an integrator in a time window 220 (or in a plurality of time windows distributed as a function of the relative time positions of the expected pulses), for each of the I and Q channels. The time windows follow each other at a frequency F, and the integration results on the two channels are subjected to an analog/digital conversion in the conversion stage 230.

However, this architecture cannot determine the time of arrival of the pulse within the integration window, therefore the time of arrival measurement is not very precise.

Patent application EP-A-1580901 discloses a method of detecting the time of arrival of a pulse within a time window.

The principle of this method is shown in FIG. 3. This method uses a UWB receiver 300 comprising a first frequency translation stage to convert the signal into baseband 310, a passband or low-pass filter stage (not shown) followed for each of the I and Q channels by a correlation stage with two low frequency sine curves in quadrature. More precisely, the quadrature mixer 320 projects the signal in phase, denoted $s_I$, onto a base composed of two orthogonal low frequency sine curves. Similarly, the mixer in quadrature 322 projects the signal in quadrature, denoted $s_Q$, onto this same base. Each mixer in quadrature comprises a first elementary mixer with a first base signal (in this case a cosinusoidal signal) and a secondary elementary mixer with a second base signal (in this case a sinusoidal signal), orthogonal to the first. The signals obtained by projection, denoted $s_{II},s_{IQ}$ for the I channel and $s_{QI},s_{QQ}$ for the Q channel, are integrated inside a time detection window, using integrators 330. If necessary, integration results are accumulated over a plurality of time windows, separated by the UWB signal repetition period or offset according to a time hopping code. The integrated signals are quadratically summated in 335, 340 and the sum thus obtained is compared with a threshold value at 350. If the sum obtained exceeds the threshold value, the receiver concludes that a pulse was received in the time window. The UWB receiver 300 is said to have a double quadrature architecture.

The UWB double quadrature receiver is capable of localising a UWB pulse in the time detection window.

The article by G. Masson et al. entitled <<*A 1 nJ/b 3.2 to 4.7 GHz UWB 50 Mpulses/s double quadrature receiver for communication and localization*>> published in Proc. of the ESSCIRC 2010, 14-16 Sep. 2010, pp. 502-505, describes the manufacture of a double quadrature receiver and mentions the possibility of using an orthogonal base composed of low frequency orthogonal sine curves to deduce the time of arrival (ToA) of a UWB pulse in a time detection window.

More precisely, it can be shown that after translation into the baseband by the first stage, the correlation of the UWB pulse with the two above-mentioned orthogonal sine curves with frequency $f_{LO2}=1/\Delta T$, on an integration window with a width equal to a period $\Delta T$ are proportional to $$\cos\left(2\pi\frac{\tau}{\Delta T}\right) \text{ and } \sin\left(2\pi\frac{\tau}{\Delta T}\right)$$

respectively, where τ is the time of arrival of the pulse.

The precision with which the detector can measure the time of arrival depends particularly on the frequency $f_{LO2}$. Since this frequency was chosen to be relatively low so as not to have an excessively short integration window (which might not contain the pulse), the measurement of the time of arrival might not be sufficiently precise. The increase in the frequency $f_{LO2}$ would then lead to consideration of a large number of samples.

Furthermore, the precision of the time of arrival measurement is affected by unbalances (phase and gain) that occur at each stage of the mix in quadrature.

Finally, reception noise, particularly at the second stage, limits the precision that can be achieved with the above-mentioned double quadrature receiver.

Consequently, the purpose of this invention is to disclose a method of determining the time of arrival of a UWB pulse capable of obtaining better measurement precision but without requiring a more complex detector architecture.

PRESENTATION OF THE INVENTION

This invention is defined by a method of estimating the time of arrival of a UWB pulse contained in an RF signal, said UWB pulse being modulated at a carrier frequency, the method comprising the following steps:

(a) reception of the RF signal and translation of the signal thus received in baseband using a first mix in quadrature to provide a signal in phase and a signal in quadrature with the signal of a first local oscillator, said signals in phase and in quadrature forming a baseband signal;

(b) projection of the signal in phase onto a base composed of first and second periodic signals orthogonal to each other, to provide first and second projection signals respectively, said projection being made by means of a second mix in quadrature and an integration on a time window;

(c) projection of the signal in quadrature onto said base, to provide third and fourth projection signals respectively, said projection being done by means of a third mix in quadrature and an integration onto said time window;

(d) an estimate of the phase of the RF signal relative to the signal of the first local oscillator and an estimate of the phase of the baseband signal relative to the first/second periodic signal, starting from the first, second, third and fourth projection signals, the time of arrival of said pulse being obtained from the two phases thus estimated.

Advantageously, the time of arrival is obtained by means of:

- a first estimate of the time of arrival starting from the phase of the baseband signal thus estimated;
- a second estimate of the time of arrival starting from the phase of the RF signal thus estimated, this second estimate being obtained with an ambiguity equal to an integer multiple approximately equal to the half-period of the carrier frequency;
- a comparison between the first and second time of arrival estimates to obtain an unambiguous estimate of the time of arrival, based on said second estimate.

According to a first variant, the phase of the RF signal is estimated from:

$$\hat{\varphi}_{RF} = \text{Arctan}\sqrt{\frac{s_{QI}^2 + s_{QQ}^2}{s_{IQ}^2 + s_{II}^2}}$$

where $s_{II}$, $s_{IQ}$, $s_{QI}$, $s_{QQ}$ are the first, second, third and fourth projection signals respectively.

According to a second variant, the phase of the RF signal is estimated from:

$$\hat{\varphi}_{RF} = \pi/2 - \text{Arctan}\sqrt{\frac{s_{IQ}^2 + s_{II}^2}{s_{QI}^2 + s_{QQ}^2}}$$

where $s_{II}$, $s_{IQ}$, $s_{QI}$, $s_{QQ}$ are the first, second, third and fourth projection signals respectively.

The phase of the baseband signal is advantageously estimated using a first estimator:

$$\hat{\varphi}_{BB}^{3\&5} = \cos^2(\hat{\varphi}_{RF})\text{Arctan}\left(\frac{s_{IQ}}{s_{II}}\right) + \sin^2(\hat{\varphi}_{RF})\text{Arctan}\left(\frac{s_{QQ}}{s_{QI}}\right)$$

if it is close to 0 (modulo $\pi$), or using a second estimator:

$$\hat{\varphi}_{BB}^{4\&6} = \pi/2 - \cos^2(\hat{\varphi}_{RF}) \cdot \text{Arctan}\left(\frac{s_{II}}{s_{IQ}}\right) - \sin^2(\hat{\varphi}_{RF})\text{Arctan}\left(\frac{s_{QI}}{s_{QQ}}\right)$$

if it is close to $\pi/2$ (modulo $\pi$);

$\hat{\varphi}_{RF}$ being said estimate of the RF signal and $s_{II}$, $s_{IQ}$, $s_{QI}$, $s_{QQ}$ being the first, second, third and fourth projection signals respectively.

In a first variant, it is determined if the phase of the baseband signal is close to 0 (or $\pi/2$ (modulo $\pi$)), by determining if an estimate of this phase using a third estimator:

$$\hat{\varphi}_{BB}^1 = \text{Arctan}\sqrt{\frac{s_{IQ}^2 + s_{QQ}^2}{s_{QI}^2 + s_{II}^2}}$$

is close to 0 (or $\pi/2$ (modulo $\pi$)) respectively.

In a second variant, it is determined if the phase of the baseband signal is close to 0 (or $\pi/2$ (modulo $\pi$), by determining if an estimate of this phase by a fourth estimator:

$$\hat{\varphi}_{BB}^2 = \pi/2 - \text{Arctan}\sqrt{\frac{s_{QI}^2 + s_{II}^2}{s_{IQ}^2 + s_{QQ}^2}}$$

is close to 0 (or $\pi/2$ (modulo $\pi$)) respectively.

Preferably, the phase of the baseband signal is estimated from:

$$\hat{\varphi}_{BB} = \text{Arctan}\sqrt{\frac{s_{IQ}^2 + s_{QQ}^2}{s_{QI}^2 + s_{II}^2}}$$

where $s_{II}$, $s_{IQ}$, $s_{QI}$, $s_{QQ}$ are the first, second, third and fourth projection signals respectively.

Alternately, the phase of the baseband signal is estimated from:

$$\hat{\varphi}_{BB} = \pi/2 - \text{Arctan}\sqrt{\frac{s_{QI}^2 + s_{II}^2}{s_{IQ}^2 + s_{QQ}^2}}$$

where $s_{II}$, $s_{IQ}$, $s_{QI}$, $s_{QQ}$ are the first, second, third and fourth projection signals respectively.

The phase of the RF signal is advantageously estimated by means of a first estimator:

$$\hat{\varphi}_{RF}^{3\&5} = \cos^2(\hat{\varphi}_{BB})\text{Arctan}\left(\frac{s_{QI}}{s_{II}}\right) + \sin^2(\hat{\varphi}_{BB})\text{Arctan}\left(\frac{s_{QQ}}{s_{IQ}}\right)$$

if it is close to 0 (modulo $\pi$) or by means of a second estimator:

$$\hat{\varphi}_{RF}^{4\&6} = \pi/2 - \cos^2(\hat{\varphi}_{BB})\text{Arctan}\left(\frac{s_{II}}{Q_{QI}}\right) - \sin^2(\hat{\varphi}_{BB})\text{Arctan}\left(\frac{s_{IQ}}{S_{QQ}}\right)$$

if it is close to $\pi/2$ (modulo $\pi$);

$\hat{\varphi}_{BB}$ being said estimate of the baseband signal and $s_{II}$, $s_{IQ}$, $s_{QI}$, $s_{QQ}$ being the first, second, third and fourth projection signals respectively.

According to a first variant, it is determined if the phase of the RF signal is close to 0 ($\pi/2$ (modulo $\pi$)), by determining if an estimate of this phase by a third estimator:

$$\hat{\varphi}_{RF}^1 = \text{Arctan}\sqrt{\frac{s_{QI}^2 + s_{QQ}^2}{s_{IQ}^2 + s_{II}^2}}$$

is close to 0 (or $\pi/2$ (modulo $\pi$)) respectively.

According to a second variant, it is determined if the phase of the RF signal is close to 0 (or $\pi/2$ (modulo $\pi$)), by determining if an estimate of this phase by a fourth estimator:

$$\hat{\varphi}_{RF}^2 = \pi/2 - \text{Arctan}\sqrt{\frac{s_{IQ}^2 + s_{II}^2}{s_{QI}^2 + s_{QQ}^2}}$$

is close to 0 (or $\pi/2$ (modulo $\pi$)) respectively.

The first estimate of the time of arrival $\hat{\tau}_{BB}$ of the UWB pulse is typically obtained from:

$$\hat{\tau}_{BB} = \tau_{window} + \Delta T \frac{\hat{\varphi}_{BB}}{2\pi}$$

where $\tau_{window}$ is the beginning of said time window, $\Delta T$ is the duration of said time window and $\hat{\varphi}_{BB}$ is said estimate of the phase of the baseband signal.

Similarly, the second estimate of the time of arrival $\hat{\tau}_{RF}$ of the UWB pulse is typically obtained from:

$$\hat{\tau}_{RF} = \tau_{window} + T_0 \cdot \frac{\hat{\varphi}_{RF} - \gamma}{2\pi} + k\frac{T_0}{2}$$

where $\tau_{window}$ is the beginning of said time window, $T_0$ is a period of the carrier frequency, $\hat{\varphi}_{RF}$ is said estimate of the phase of the RF signal, k is a positive, negative or zero integer, and $\gamma$ is a phase shift obtained by calibration.

Said integer is advantageously determined to minimise the absolute value of the difference between the first and second estimates of the time of arrival.

BRIEF DESCRIPTION OF THE DRAWINGS

Other characteristics and advantages of the invention will become clear after reading the preferred embodiments of the invention with reference to the appended figures among which.

DETAILED PRESENTATION OF PARTICULAR EMBODIMENTS

In the following, we will consider a receiver designed to receive a UWB pulse signal. This pulse signal may or may not be coded by a time hopping code, it may be unmodulated or modulated by modulation symbols belonging to a position, sign or amplitude modulation alphabet. In all cases, it will be assumed that the receiver must determine the time of arrival of a UWB pulse, either to be able to synchronise with it or to be able to deduce a propagation time or a distance.

A UWB signal pulse received by the receiver can generally be written in the following form:

$$s_r(t) = p(t) \cdot \cos(2\pi f_0(t-\tau) + \gamma) \quad (3)$$

where $p(t) = A_r$ $$\exp\left(-\frac{(t-\tau)^2}{2 \cdot \Delta_\tau^2}\right)$$

is the wave shape of the pulse in baseband, assumed to be Gaussian, $f_0$ is the carrier frequency, $\gamma$ is the phase shift between the emitter and the receiver (more precisely between the carrier signal generated by the local oscillator of the emitter and the baseband translation signal generated by the local oscillator of the receiver); $A_r$ is the pulse amplitude and $\Delta_r$ is a duration representative of the inverse of the pulse bandwidth.

The basic idea of the invention is to use a double quadrature architecture known according to prior art but to use the phase information derived from the RF signal and the information derived from the signal corrected to the baseband to more precisely estimate the time of arrival of the pulse.

Figure 1:
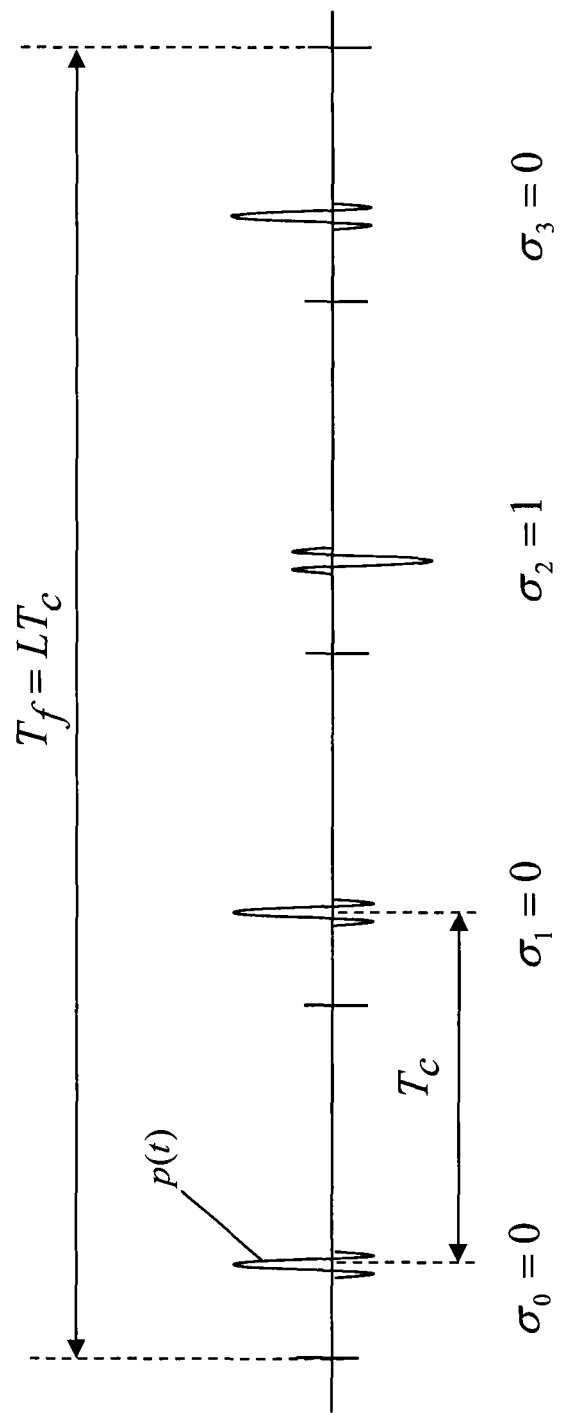
FIG. 1, already described, shows an example of a pulse type UWB signal.
Figure 2:
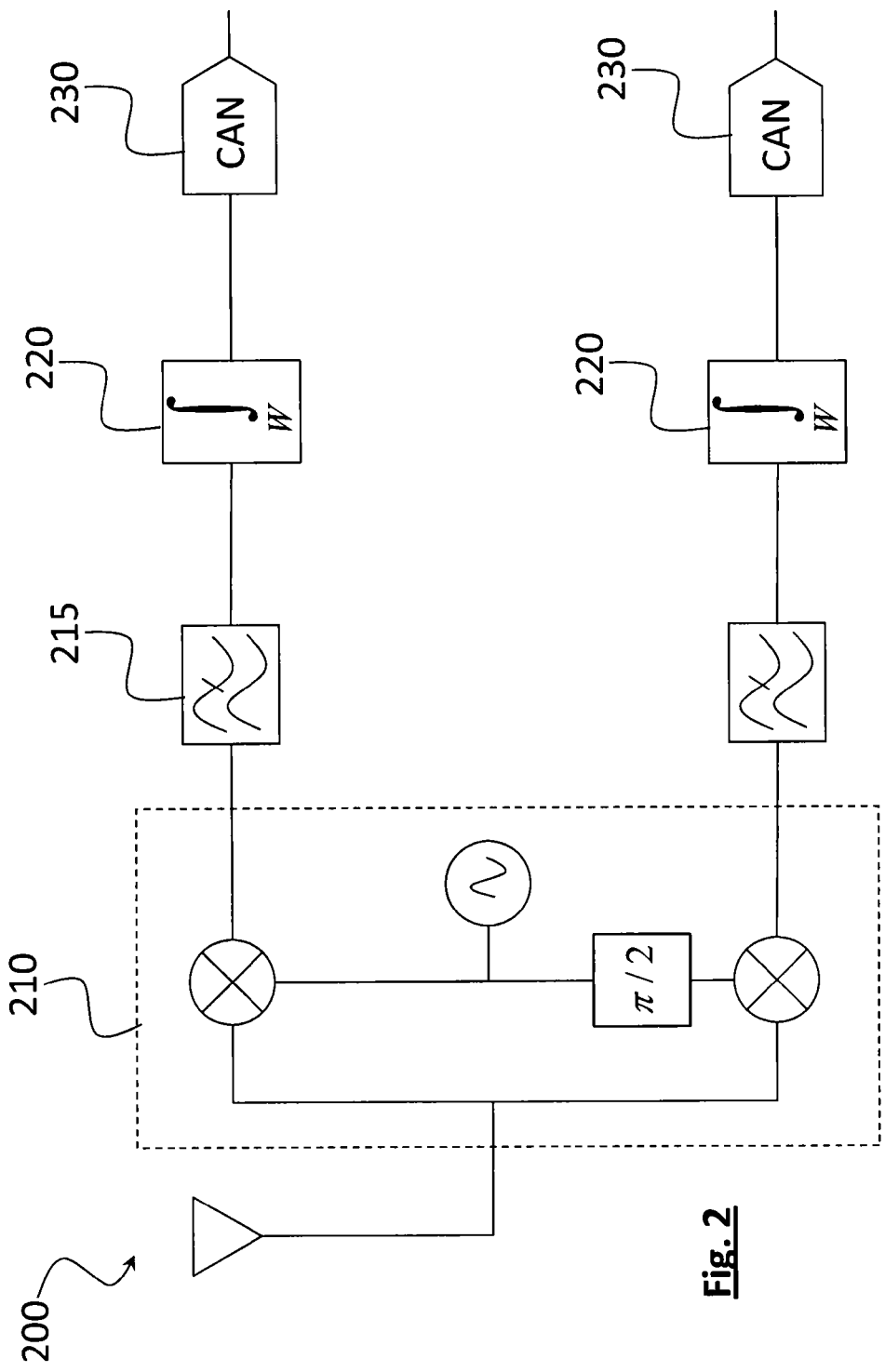
FIG. 2, already described, diagrammatically shows the structure of a first UWB receiver to detect the presence of a UWB pulse in a time window.
Figure 3:
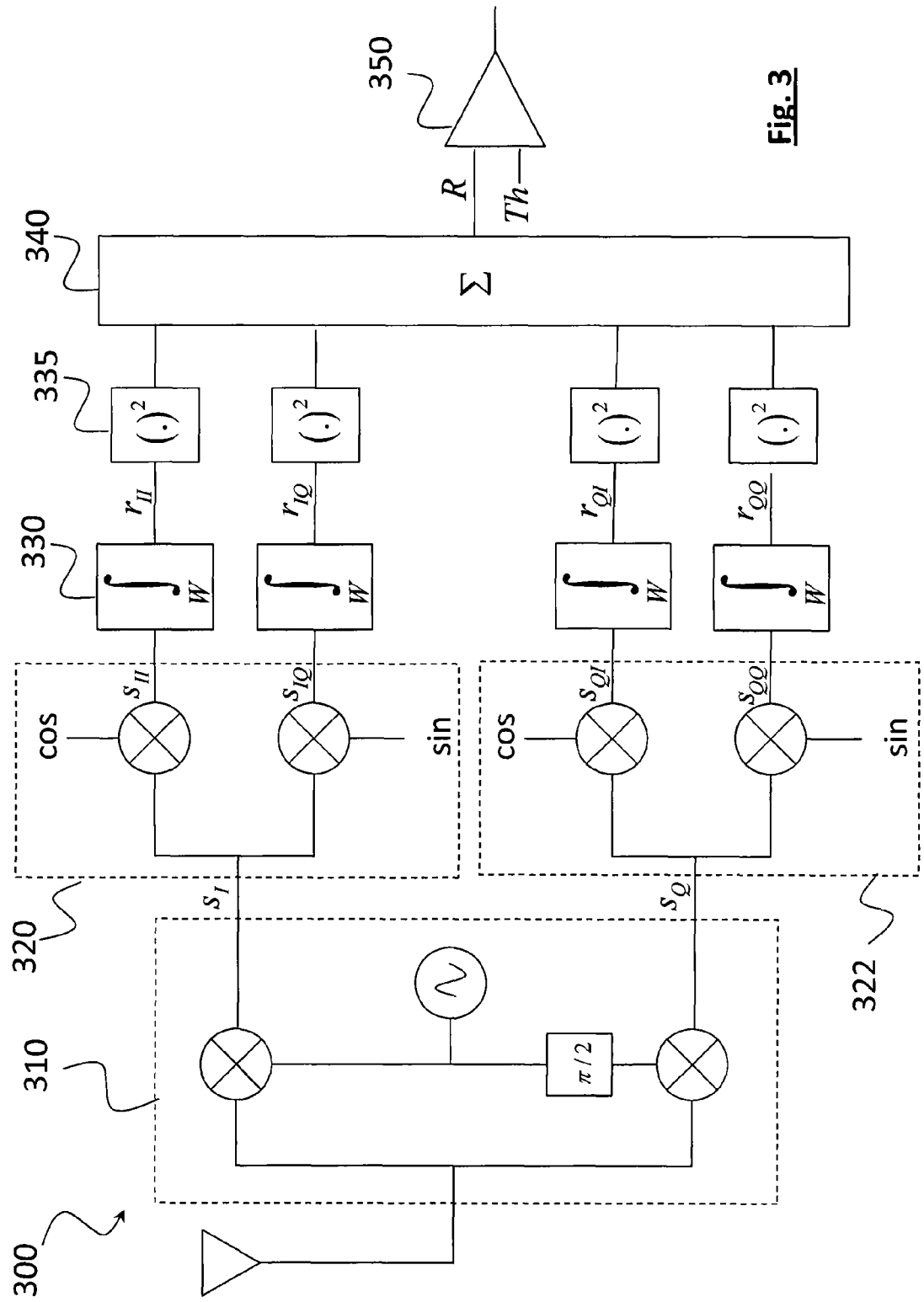
FIG. 3, already described, diagrammatically shows the structure of a second UWB receiver to detect the presence of a UWB pulse in a time window.
Figure 4:
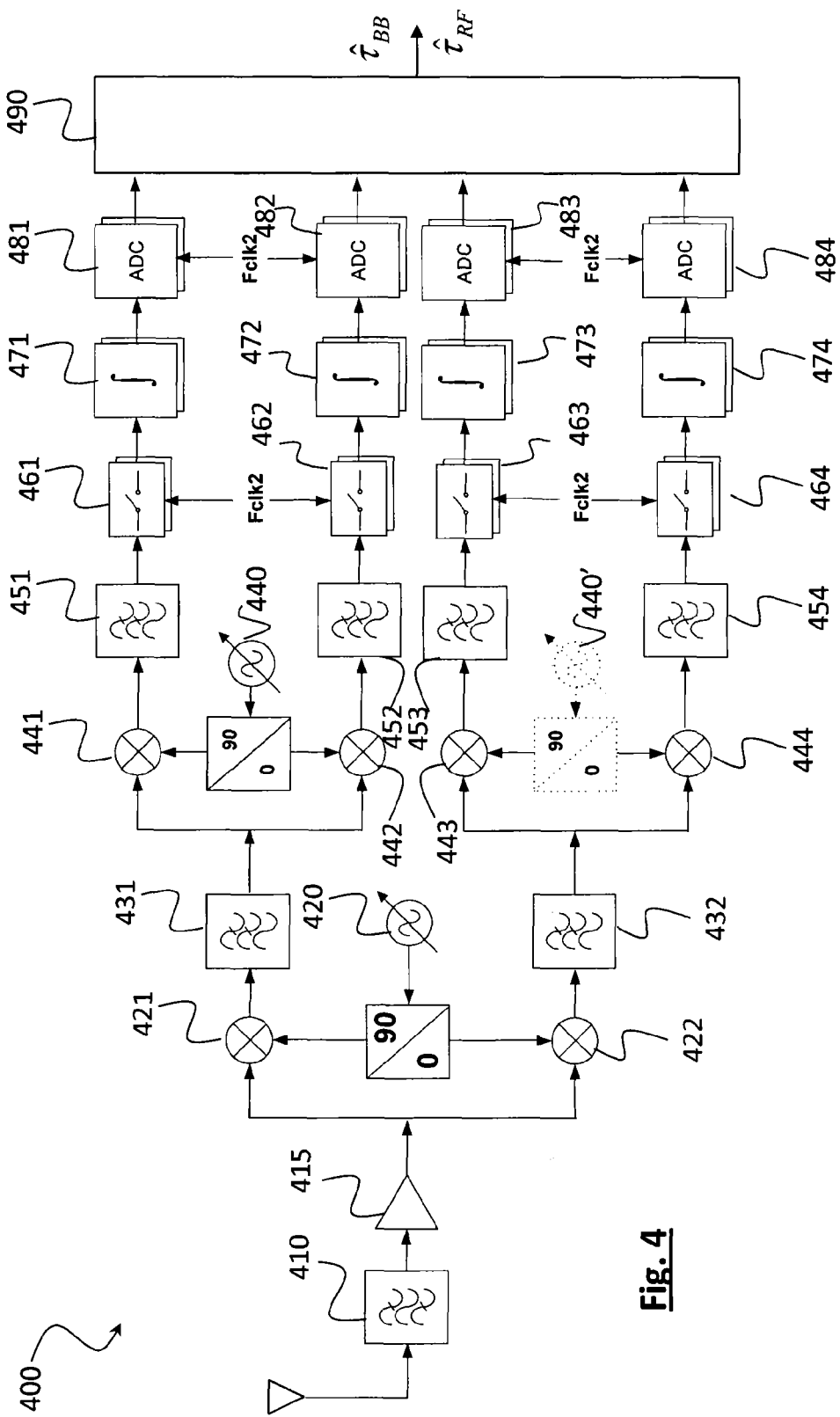
FIG. 4 diagrammatically shows the structure of a UWB receiver to estimate the time of arrival of a pulse according to a first or a second embodiment of the invention.

More precisely, FIG. 4 diagrammatically shows a UWB double quadrature receiver according to one embodiment of the invention.

Receiver 400 comprises an RF filter 410 at the input, followed by a low noise amplifier 415. The received, filtered and amplified UWB signal is translated into baseband by means of a first mixer in quadrature. This mixer in quadrature comprises a local oscillator 420 at a reception frequency $f_{LO1}$ ideally adjusted to match the frequency $f_0$, and two elementary mixers 421, 422 mixing the UWB signal with two sine curves in quadrature to provide baseband signals $s_I$ for the channel in phase and $s_Q$ for the channel in quadrature, after low pass filtering in filters 431 and 432.

Signal $s_I$ is projected onto an orthogonal base using a second mixer in quadrature, said orthogonal base being composed of two low frequency orthogonal signals, for example two orthogonal sine curves at a frequency $f_{LO2} \ll f_{LO1}$. This second modulator in quadrature comprises a local oscillator 440 and two elementary mixers 441 and 442, mixing signal $s_I$ with the two above-mentioned orthogonal signals respectively. The projected signals are filtered using low pass filters 451, 452, and then sampled using samplers 461, 462 before being integrated onto a time window using the integrators 471, 472 and digitised by analog-digital converters 481, 482. The signals projected onto the orthogonal base at the output from these converters are denoted $s_{II}$, $s_{IQ}$ respectively.

Similarly, the signal $s_Q$ is projected onto the same orthogonal base by means of a third mixer in quadrature. This third mixer comprises a local oscillator 440' and two elementary mixers 443 and 444, mixing signal $s_Q$ with the two above-mentioned orthogonal signals respectively. The local oscillator 440' at frequency $f_{LO2}$ can be coincident with the local oscillator 440. The projected signals are filtered by low pass filters 453, 454, and then sampled by samplers 463, 464 before being integrated onto a time window using integrators 473, 474 and digitised by analog-digital converters 483, 484. Signals projected onto the orthogonal base at the output from these converters are denoted $s_{QI}$, $s_{QQ}$ respectively.

Note that the converters 481-484 may be located on the input side of the processing system, for example immediately behind the samplers 461-464, the integration onto the time window then being done digitally.

Signal $s_{II}$ at the output from the first channel is given by the expression:

$$s_{II} = \int_{\Delta T} s_r(t) \cdot \cos(2\pi f_{LO1} t) \cdot \cos(2\pi f_{LO2} t) dt \quad (4)$$

in which it is assumed that the orthogonal base is composed of $\cos(2\pi f_{LO2} t)$ and $\sin(2\pi f_{LO2} t)$ and in which $\Delta T$ is the width of the integration window.

Considering that the signal $s_r(t)$ is filtered by the low pass filters 431 and 432 at the output from the first mixer, the spectral contributions at $2f_0$ are eliminated and signal $s_{II}$ is in the following form:

$$s_{II} = \frac{1}{2}\cos(\gamma - 2\pi f_0 \tau) \int_{\Delta T} A_r \cdot p(t-\tau) \cdot \cos(2\pi f_{LO2} t) dt \quad (5)$$

In practice, the characteristic pulse time is significantly shorter than the width of the integration window. The result is that the pulse may be given approximately by a Dirac function and therefore:

$$s_{II} \approx \frac{1}{2}\cos(\gamma - 2\pi f_0 \tau) \cdot \cos(2\pi f_{LO2} \tau) \int_{\Delta T} A_r \cdot p(t-\tau) dt \quad (6)$$

$$\approx \frac{\alpha}{2} \cdot \cos(\varphi_{RF}(\tau)) \cdot \cos(\varphi_{BB}(\tau))$$

where the constant $\alpha$ is proportional to the pulse energy and in which $\phi_{RF}(\tau)=\gamma-2\pi f_0\tau$, $\phi_{BB}(\tau)=2\pi f_{LO2}\tau$.

Similar expressions are obtained for the other channels, namely:

$$s_{II} \approx \frac{\alpha}{2} \cdot \cos(\varphi_{RF}(\tau)) \cdot \cos(\varphi_{BB}(\tau)) \quad (7\text{-}1)$$

$$s_{IQ} \approx \frac{\alpha}{2} \cdot \cos(\varphi_{RF}(\tau)) \cdot \sin(\varphi_{BB}(\tau)) \quad (7\text{-}2)$$

$$s_{QI} \approx -\frac{\alpha}{2} \cdot \sin(\varphi_{RF}(\tau)) \cdot \cos(\varphi_{BB}(\tau)) \quad (7\text{-}3)$$

$$s_{QQ} \approx -\frac{\alpha}{2} \cdot \sin(\varphi_{RF}(\tau)) \cdot \sin(\varphi_{BB}(\tau)) \quad (7\text{-}4)$$

Finally, receiver 400 comprises a computer 490 receiving signals $s_{II}$, $s_{IQ}$, $s_{QI}$, $s_{QQ}$ and deducing an estimated time of arrival as explained below.

It will be seen that each of the signals $s_{II}$, $s_{IQ}$, $s_{QI}$, $s_{QQ}$ comprises two phase multiplication terms, a first term characteristic of the phase of the RF signal relative to the carrier and a second term characteristic of the phase of the baseband signal relative to the beginning of the integration window.

A time of arrival estimator may be obtained for example by eliminating firstly the first multiplication terms between equations (7-1) and (7-3) and secondly equations (7-2) and (7-4).

Thus according to a first variant, the phase $\phi_{BB}(\tau)$ may be estimated as follows:

$$\hat{\varphi}_{BB}^1 = \text{Arctan}\sqrt{\frac{s_{IQ}^2 + s_{QQ}^2}{s_{QI}^2 + s_{II}^2}} \quad (8\text{-}1)$$

According to a second variant, the phase $\phi_{BB}(\tau)$ may be estimated as follows:

$$\hat{\varphi}_{BB}^2 = \pi/2 - \text{Arctan}\sqrt{\frac{s_{QI}^2 + s_{II}^2}{s_{IQ}^2 + s_{QQ}^2}} \quad (8\text{-}2)$$

Due to the presence of square roots as an argument of the arc tangent function in expressions (8-1) and (8-2), it will be understood that the estimators $\hat{\phi}_B^1$ and $\hat{\phi}_{BB}^2$ estimate the phase $\phi_{8B}(\tau)$ except for the sign.

The signed phase $\phi_{BB}(\tau)$ can be estimated using the following estimators:

According to a first variant, the phase $\phi_{BB}(\tau)$ may be estimated as follows:

$$\hat{\varphi}_{BB}^3 = \text{Arctan}\left(\frac{s_{IQ}}{s_{II}}\right) \quad (9\text{-}1)$$

According to a second variant, the phase $\phi_{BB}(\tau)$ may be estimated as follows:

$$\hat{\varphi}_{BB}^4 = \pi/2 - \text{Arctan}\left(\frac{s_{II}}{s_{IQ}}\right) \quad (9\text{-}2)$$

According to a third variant, the phase $\phi_{BB}(\tau)$ may be estimated as follows:

$$\hat{\varphi}_{BB}^5 = \text{Arctan}\left(\frac{s_{QQ}}{s_{QI}}\right) \quad (9\text{-}3)$$

According to a fourth variant, the phase $\phi_{BB}(\tau)$ may be estimated as follows:

$$\hat{\varphi}_{BB}^6 = \pi/2 - \text{Arctan}\left(\frac{s_{QI}}{s_{QQ}}\right) \quad (9\text{-}4)$$

According to a first embodiment of the invention, the first step is to make a first estimate of the phase of the baseband signal. Advantageously, this first estimate may be made using the estimator (8-1) or (8-2).

This first estimate has the advantage of being stable in that it takes account of several outputs from the double quadrature demodulator. On the other hand, as mentioned above, it cannot give information about the sign of the phase.

As a result of this first estimate, it is determined if the phase $\phi_{BB}(\tau)$ is closer to 0 (modulo $\pi$) or to $\pi/2$ (modulo $\pi$).

In the first case, a linear combination of a first pair of estimators of the phase of the baseband signal is used, namely estimators given by (9-1) and (9-3) or by (9-2) and (9-4).

The estimator given by (9-1) or (9-2) gives good results when the channel in phase (signal $s_I$) has a high intensity (this intensity is proportional to $\cos^2(\phi_{RF}(\tau))$). It gives noisy results when this intensity is low. Similarly, the estimator given by (9-3) or (9-4) gives good results when the channel in quadrature (signal $s_Q$) has a high intensity (this intensity is proportional to $\sin^2(\phi_{RF}(\tau))$) and noisy results when this intensity is low.

Advantageously, the estimators on the I and Q channels will be weighted by the intensities of signals $s_I$ and $s_Q$ respectively, to obtain a second estimate of the phase of the baseband signal, with good robustness to noise, regardless of the distribution of energy over the four outputs $s_{II}$, $s_{IQ}$, $s_{QI}$, $s_{QQ}$:

$$\hat{\varphi}_{BB}^{3\&5} = \cos^2(\hat{\varphi}_{RF})\text{Arctan}\left(\frac{s_{IQ}}{s_{II}}\right) + \sin^2(\hat{\varphi}_{RF})\text{Arctan}\left(\frac{s_{QQ}}{s_{QI}}\right) \quad (10)$$

where $\hat{\varphi}_{RF}$ is an estimate of the phase of the RF signal, $\phi_{RF}(\tau)$, for example given by the estimator:

$$\hat{\varphi}_{RF}^1 = \text{Arctan}\sqrt{\frac{s_{QI}^2 + s_{QQ}^2}{s_{IQ}^2 + s_{II}^2}} \quad (11\text{-}1)$$

or by the estimator:

$$\hat{\varphi}_{RF}^2 = \pi/2 - \text{Arctan}\sqrt{\frac{s_{IQ}^2 + s_{II}^2}{s_{QI}^2 + s_{QQ}^2}} \quad (11\text{-}2)$$

Due to the presence of the square root in the argument of the arc tangent function, the $\hat{\varphi}_{RF}^1$ and $\hat{\varphi}_{RF}^2$ estimators estimate the phase $\phi_{RF}(\tau)$ except for the sign. However, this uncertainty is not important in the estimator $\hat{\varphi}_{BB}^{3\&5}$ because these estimators contribute through their squares.

When $\phi_{BB}(\tau)$ is close to 0, the $\hat{\varphi}_{BB}^{3\&5}$ estimator is stable and has good linearity and better precision than $\hat{\varphi}_{BB}^1$ or $\hat{\varphi}_{BB}^2$.

In the second case mentioned above, namely when $\phi_{BB}(\tau)$ is close to $\pi/2$ (modulo $\pi$), the $\hat{\varphi}_{BB}^{3\&5}$ estimator is unstable and it is preferred to use a linear combination of a second pair of estimators operating on the channel in quadrature, namely those given by (9-2) and (9-4):

$$\hat{\varphi}_{BB}^{4\&6} = \quad (12)$$
$$\cos^2(\hat{\varphi}_{RF}) \cdot \left[\pi/2 - \text{Arctan}\left(\frac{s_{II}}{s_{IQ}}\right)\right] + \sin^2(\hat{\varphi}_{RF})\left[\pi/2 - \text{Arctan}\left(\frac{s_{QI}}{s_{QQ}}\right)\right]$$

which can be simplified to:

$$\hat{\varphi}_{BB}^{4\&6} = \pi/2 - \cos^2(\hat{\varphi}_{RF}) \cdot \text{Arctan}\left(\frac{s_{II}}{s_{IQ}}\right) - \sin^2(\hat{\varphi}_{RF})\text{Arctan}\left(\frac{s_{QI}}{s_{QQ}}\right) \quad (13)$$

Thus, if the phase $\phi_{BB}(\tau)$ is closer to 0 than to $\pi/2$ (modulo $\pi$), the $\hat{\varphi}_{BB}^{3\&5}$ estimator is used, and otherwise the $\hat{\varphi}_{BB}^{4\&6}$ estimator is used.

In the embodiment described above, the computer 490 estimates the phase of the baseband $\hat{\varphi}_{BB}$, according to expressions (10) and (13) depending on whether it is closer to 0 or to $\pi/2$ as explained above.

Note that other baseband phase estimators can be used instead. For example, firstly the energy $\alpha^2$ of the received signal can be estimated from the $s_{II}$, $s_{IQ}$, $s_{QI}$, $s_{QQ}$ signals and the phase $\phi_{BB}(\tau)$ can then be estimated by making a combination of the terms in $$\text{Arccos}\left(\frac{2\sqrt{s_{II}^2 + s_{QI}^2}}{\hat{\alpha}}\right) \text{ and } \text{Arcsin}\left(\frac{2\sqrt{s_{IQ}^2 + s_{QQ}^2}}{\hat{\alpha}}\right).$$

Figure 5:
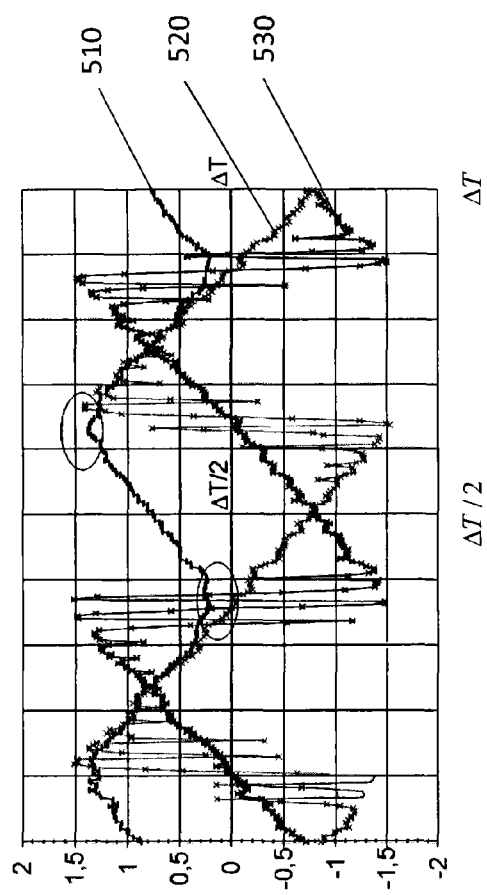
FIG. 5 shows the variation of three phase estimators as a function of the time of arrival.

FIG. 5 shows the variation of the estimates of $\phi_{BB}(\tau)$ given by the $\hat{\varphi}_{BB}^1$, $\hat{\varphi}_{BB}^{3\&5}$ and $\hat{\varphi}_{BB}^{4\&6}$ estimators respectively, as a function of the time of arrival $\tau$ passing through the time range of an integration window with width $\Delta T$.

It will be seen that the estimate given by the $\hat{\varphi}_{BB}^1$ estimator (curve 510) is erroneous for 0 and $\pi/2$ (zones bounded by ellipses). Errors due to noise are summated quadratically on the numerator and on the denominator of expression (8-1). Since noise is preponderant relative to the signal on the numerator of this expression when $\phi_{BB}(\tau)$ is close to 0 (modulo $\pi$), and relative to the signal on the denominator when $\phi_{BB}(\tau)$ is close to $\pi/2$ (modulo $\pi$), it will be understood why the precision of the estimator $\hat{\phi}_{BB}^1$ is degraded close to these values.

Furthermore, note that the $\hat{\phi}_{BB}^{3\&5}$ estimator (curve 520) is unstable close to $\pi/2$ (modulo $\pi$) while the $\hat{\phi}_{BB}^{4\&6}$ estimator (curve 530) is linear close to these values. Conversely, the $\hat{\phi}_{BB}^{4\&6}$ estimator is unstable close to 0 (modulo $\pi$) while the $\hat{\phi}_{BB}^{3\&5}$ estimator is linear close to these values. Therefore It will be understood that switching between $\hat{\phi}_{BB}^{3\&5}$ and $\hat{\phi}_{BB}^{4\&6}$ depending on the coarse estimate given by $\hat{\phi}_{BB}^1$ (or $\hat{\phi}_{BB}^2$) can result in a measurement of the time of arrival with better precision than $\hat{\phi}_{BB}^1$.

According to a second embodiment of the invention, the first step is to make an estimate of the phase of the RF signal. Advantageously, this first estimate may be made using the estimator (11-1) or (11-2).

With this first estimate, it will be determined if the phase $\phi_{RF}(\tau)$ is closer to 0 (modulo $\pi$) or to $\pi/2$ (modulo $\pi$).

If it is closer to 0, a linear combination of a first pair of estimators of the phase of the baseband signal can be used, namely estimators:

$$\hat{\phi}_{RF}^3 = \text{Arctan}\left(\frac{s_{QI}}{s_{II}}\right) \quad (14\text{-}1)$$

and $$\hat{\phi}_{RF}^5 = \text{Arctan}\left(\frac{s_{QQ}}{s_{IQ}}\right) \quad (14\text{-}2)$$

The estimator defined by (14-1) gives good results when the projection onto the first signal of the orthogonal base in baseband has a high intensity (this intensity is proportional to $\cos^2(\phi_{BB}(\tau))$). On the other hand, it gives noisy results when this intensity is low. The estimator defined by (14-2) is then used. This estimator gives good results when the projection onto the second signal of the orthogonal base in baseband has a high intensity (this intensity is proportional to $\sin^2(\phi_{BB}(\tau))$).

Estimators (14-1) and (14-2) are advantageously weighted to obtain a good robustness to noise regardless of the distribution of energy on the four outputs $s_{II}$, $s_{IQ}$, $s_{QI}$, $s_{QQ}$:

$$\hat{\phi}_{RF}^{3\&5} = \cos^2(\hat{\phi}_{BB})\text{Arctan}\left(\frac{s_{QI}}{s_{II}}\right) + \sin^2(\hat{\phi}_{BB})\text{Arctan}\left(\frac{s_{QQ}}{s_{IQ}}\right) \quad (15)$$

where $\hat{\phi}_{BB}$ is an estimate of the phase of the baseband signal, for example $\hat{\phi}_{BB} = \hat{\phi}_{BB}^1$ or $\hat{\phi}_{BB}^2$ given by expressions (8-1) and (8-2). Alternately, an estimate of the phase of the baseband signal can be made using estimators (10) and (13).

In the second case mentioned above, namely when $\phi_{RF}(\tau)$ is close to $\pi/2$ (modulo $\pi$), the $\hat{\phi}_{RF}^{3\&5}$ estimator is unstable and it will be preferred to use a linear combination of a second pair of estimators of the phase of the baseband signal, namely:

$$\hat{\phi}_{RF}^4 = \pi/2 - \text{Arctan}\left(\frac{s_{II}}{s_{QI}}\right) \quad (16\text{-}1)$$

and $$\hat{\phi}_{RF}^6 = \pi/2 - \text{Arctan}\left(\frac{s_{IQ}}{s_{QQ}}\right) \quad (16\text{-}2)$$

The estimator defined by (16-1) gives good results when the projection onto the first signal of the orthogonal base in baseband has a high intensity but noisy results when this intensity is low.

Conversely, the estimator defined by (16-2) gives good results when the projection onto the second signal of the orthogonal base in baseband has high intensity but noisy results when this intensity is low.

The estimators (17-1) and (17-2) will then advantageously be weighted so as to give good robustness to noise, regardless of the energy distribution on the four outputs $s_{II}$, $s_{IQ}$, $s_{QI}$, $s_{QQ}$:

$$\hat{\phi}_{RF}^{4\&6} = \qquad (17)$$
$$\cos^2(\hat{\phi}_{BB})\left[\pi/2 - \text{Arctan}\left(\frac{s_{II}}{s_{QI}}\right)\right] + \sin^2(\hat{\phi}_{BB})\left[\pi/2 - \text{Arctan}\left(\frac{s_{IQ}}{s_{QQ}}\right)\right]$$

which can be simplified to:

$$\hat{\phi}_{RF}^{4\&6} = \pi/2 - \cos^2(\hat{\phi}_{BB})\text{Arctan}\left(\frac{s_{II}}{s_{QI}}\right) - \sin^2(\hat{\phi}_{BB})\text{Arctan}\left(\frac{s_{IQ}}{s_{QQ}}\right) \quad (18)$$

Thus, the $\hat{\phi}_{RF}^{3\&5}$ estimator will be used if the phase $\phi_{RF}(\tau)$ is closer to 0 than to $\pi/2$ (modulo $\pi$), and otherwise the $\hat{\phi}_{RF}^{4\&6}$ estimator will be used. The changeover from one to the other may be made from a first coarse estimate of $\phi_{RF}(\tau)$, for example as given by $\hat{\phi}_{RF}^1$ or $\hat{\phi}_{RF}^2$ and a comparison with a threshold value (for example $\pi/4$).

Figure 6:
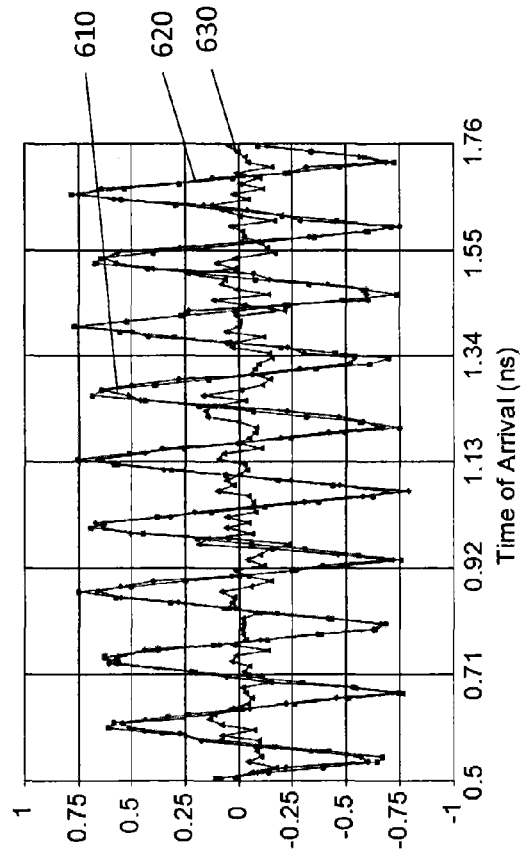
FIG. 6 shows a phase estimate error starting from the UWB receiver in FIG. 4.

FIG. 6 shows the error of an estimate of the phase $\phi_{RF}(\tau)$ from the receiver in FIG. 4.

In this case, it is assumed that the phase estimate is made using estimators (15) and (18). The frequency $f_{LO1}$ assumed equal to the frequency $f_0$ of the emitter is equal to 4 GHz, the frequency $f_{LO2}$ is assumed equal to 400 MHz.

More precisely, FIG. 6 gives the variation of the estimate of the phase $\phi_{RF}$ in 610 for a time of arrival range of the UWB pulse, and the theoretical variation of the phase $\phi_{RF}$ in 620. The estimate error is shown in 630.

It will be seen that the error on the phase is less than 0.2 rad, which results in a corresponding error on the distance equal to less than 2.5 mm, namely an order of magnitude smaller than the error obtained using the receiver according to prior art.

Regardless of the embodiment of the invention, the computer estimates the phase of the baseband signal ($\phi_{BB}(\tau)$) and estimates the phase of the RF signal ($\phi_{RF}(\tau)$), one estimate possibly using the other as described above. Advantageously, cross iterations can be made between the estimate of $\phi_{BB}(\tau)$ and the estimate of $\phi_{RF}(\tau)$. For example, an estimate of $\phi_{BB}(\tau)$ can be made according to (10) and (13) and this estimate can then be injected into (15) and (18) to obtain an estimate of $\phi_{RF}(\tau)$. This estimate of $\phi_{RF}(\tau)$ may be used in turn in (10) and (13) for a more precise estimate of $\phi_{BB}(\tau)$, etc.

Once the estimates of $\phi_{BB}(\tau)$ and $\phi_{RF}(\tau)$ denoted $\hat{\phi}_{BB}$ and $\hat{\phi}_{RF}$ respectively have been obtained, the computer 490 obtains a first estimate of the time of arrival of the pulse using:

$$\hat{\tau}_{BB} = \tau_{window} + \Delta T \frac{\hat{\phi}_{BB}}{2\pi} \quad (19)$$

where $\tau_{window}$ is the time indicating the beginning of the time window and a second estimate of the time of arrival of the pulse using:

$$\hat{\tau}_{RF} = \tau_{window} + T_0 \cdot \frac{\hat{\varphi}_{RF} - \gamma}{2\pi} + k\frac{T_0}{2} \quad (20)$$

where k is a positive, negative or zero integer, representing the fact that the phase $\phi_{RF}(\tau)$ is known modulo π, and where γ is the phase shift between the emitter and the receiver (it being understood that this phase is zero if the emitter and the receiver are coincident). The phase shift may for example be obtained using a calibration step.

It will be noted that there is no ambiguity with estimate (19), however on the other hand it is less precise than estimate (20).

The computer 490 determines the integer $\hat{k}$ of the estimate (20) such that:

$$\hat{k} = \underset{k}{\operatorname{argmin}}(|\hat{\tau}_{RF} - \hat{\tau}_{BB}|) \quad (21)$$

and deduces the final estimate of the time of arrival by:

$$\hat{\tau}_{RF} = \tau_{window} + T_0 \cdot \frac{\hat{\varphi}_{RF} - \gamma}{2\pi} + \hat{k}\frac{T_0}{2} \quad (22)$$

As stated, this estimate takes account of the estimate of the phase $\hat{\phi}_{BB}$ (to eliminate the phase ambiguity e) and $\hat{\phi}_{RF}$ (to obtain a high degree of precision).

In the embodiments described above, it is assumed that $f_{LO2}=f_0$, in other words that the frequency offset of the receiver was zero.

Finally, the frequency oscillator 440 (440') may be calibrated such that $f_{LO2}=f_0$ (zero frequency offset between the receiver and the emitter). To achieve this, the emitter can transmit a plurality of successive pulses separated by a predetermined time δt.

If it is assumed that the receiver is fixed relative to the emitter during the calibration step, a frequency offset $\delta f = f_{LO2} - f_0$ between the emitter and the receiver will result in a phase slip equal to 2πδf·δt between two consecutive pulses. Therefore, it is easy to determine and to correct the offset δf from $\hat{\phi}_{RF}$ measurements corresponding to these pulses. If necessary, this calibration step may be repeated at regular intervals.

Other methods of calibrating the frequency offset or the phase shift of the receiver will be envisaged by those skilled in the art without going outside the scope of this invention.

The invention claimed is:

1. A method of estimating the time of arrival of a UWB pulse contained in an RF signal, said UWB pulse being modulated at a carrier frequency ($f_0$), the method comprising:
    receiving the RF signal and translating the signal thus received in baseband using a first mix in quadrature to provide a signal in phase ($s_I$) and a signal in quadrature ($s_Q$) with the signal of a first local oscillator, said signals in phase and in quadrature forming a baseband signal;
    projecting the signal in phase ($s_I$) onto a base composed of first and second periodic signals orthogonal to each other, to provide first and second projection signals respectively ($s_{II}$, $s_{IQ}$), said projection being made by means of a second mix in quadrature and an integration on a time window;
    projecting the signal in quadrature ($s_Q$) onto said base, to provide third and fourth projection signals respectively ($s_{QI}$, $s_{QQ}$), said projection being done by means of a third mix in quadrature and an integration on said time window; and
    estimating a phase of the RF signal ($\phi_{RF}(\tau)$) relative to the signal of the first local oscillator and estimating a phase of the baseband signal ($\phi_{BB}(\tau)$) relative to the first/second periodic signal, based on the first, second, third and fourth projection signals, the time of arrival ($\hat{\tau}_{RF}$, $\hat{\tau}_{BB}$) of said pulse being obtained from the two phases thus estimated ($\hat{\phi}_{RF}(\tau)$, $\hat{\phi}_{BB}(\tau)$).

2. The method of estimating the time of arrival according to claim 1, wherein the time of arrival is obtained by:
    a first estimate of the time of arrival starting from the phase of the baseband signal thus estimated;
    a second estimate of the time of arrival starting from the phase of the RF signal thus estimated, this second estimate being obtained with an ambiguity equal to an integer multiple approximately equal to the half-period of the carrier frequency; and
    a comparison between the first and second time of arrival estimates to obtain an unambiguous estimate of the time of arrival, based on said second estimate.

3. The method of estimating the time of arrival according to claim 1, wherein the phase of the RF signal is estimated from:

$$\hat{\varphi}_{RF} = \operatorname{Arctan}\sqrt{\frac{s_{QI}^2 + s_{QQ}^2}{s_{IQ}^2 + s_{II}^2}}$$

where $s_{II}$, $s_{IQ}$, $s_{QI}$, $s_{QQ}$ are the first, second, third and fourth projection signals respectively.

4. The method of estimating the time of arrival according to claim 1, wherein the phase of the RF signal is estimated from:

$$\hat{\varphi}_{RF} = \pi/2 - \operatorname{Arctan}\sqrt{\frac{s_{IQ}^2 + s_{II}^2}{s_{QI}^2 + s_{QQ}^2}}$$

where $s_{II}$, $s_{IQ}$, $s_{QI}$, $s_{QQ}$ are the first, second, third and fourth projection signals respectively.

5. The method of estimating the time of arrival according to claim 1, wherein the phase of the baseband signal is estimated using a first estimator:

$$\hat{\varphi}_{BB}^{3\&5} = \cos^2(\hat{\varphi}_{RF})\operatorname{Arctan}\left(\frac{s_{IQ}}{s_{II}}\right) + \sin^2(\hat{\varphi}_{RF})\operatorname{Arctan}\left(\frac{s_{QQ}}{s_{QI}}\right)$$

when an estimated phase is closer to 0 (modulo π) than π/2 (modulo π), and using a second estimator:

$$\hat{\varphi}_{BB}^{4\&6} = \pi/2 - \cos^2(\hat{\varphi}_{RF})\cdot\operatorname{Arctan}\left(\frac{s_{II}}{s_{IQ}}\right) - \sin^2(\hat{\varphi}_{RF})\operatorname{Arctan}\left(\frac{s_{QI}}{s_{QQ}}\right)$$

when an estimated phase is closer to π/2 (modulo π) than 0 (modulo π), $\hat{\phi}_{RF}$ being said estimate of the RF signal and $s_{II}$, $s_{IQ}$, $s_{QI}$, $s_{QQ}$, being the first, second, third and fourth projection signals respectively.

6. The method of estimating the time of arrival according to claim 5, wherein it is determined if the phase of the baseband signal is closer to 0 or $\pi/2$ (modulo $\pi$), by determining if an estimate of this phase using a third estimator:

$$\hat{\varphi}_{BB}^1 = \text{Arctan}\sqrt{\frac{s_{IQ}^2 + s_{QQ}^2}{s_{QI}^2 + s_{II}^2}}$$

is closer to 0 (or $\pi/2$ (modulo $\pi$) respectively.

7. The method of estimating the time of arrival according to claim 5, wherein it is determined if the phase of the baseband signal is closer to 0 or $\pi/2$ (modulo $\pi$), by determining if an estimate of this phase by a fourth estimator:

$$\hat{\varphi}_{BB}^2 = \pi/2 - \text{Arctan}\sqrt{\frac{s_{QI}^2 + s_{II}^2}{s_{IQ}^2 + s_{QQ}^2}}$$

is closer to 0 or $\pi/2$ (modulo $\pi$) respectively.

8. The method of estimating the time of arrival according to claim 1, wherein the phase of the baseband signal is estimated from:

$$\hat{\varphi}_{BB} = \text{Arctan}\sqrt{\frac{s_{IQ}^2 + s_{QQ}^2}{s_{QI}^2 + s_{II}^2}}$$

where $s_{II}$, $s_{IQ}$, $s_{QI}$, $s_{QQ}$ are the first, second, third and fourth projection signals respectively.

9. The method of estimating the time of arrival according to claim 8, wherein the phase of the RF signal is estimated by means of a first estimator:

$$\hat{\varphi}_{RF}^{3\&5} = \cos^2(\hat{\varphi}_{BB})\text{Arctan}\left(\frac{s_{QI}}{s_{II}}\right) + \sin^2(\hat{\varphi}_{BB})\text{Arctan}\left(\frac{s_{QQ}}{s_{IQ}}\right)$$

when an estimated phase is closer to 0 (modulo $\pi$) than $\pi/2$ (modulo $\pi$) or by means of a second estimator:

$$\hat{\varphi}_{RF}^{4\&6} = \pi/2 - \cos^2(\hat{\varphi}_{BB})\text{Arctan}\left(\frac{s_{II}}{s_{QI}}\right) - \sin^2(\hat{\varphi}_{BB})\text{Arctan}\left(\frac{s_{IQ}}{s_{QQ}}\right)$$

when an estimated phase is closer to $\pi/2$ (modulo $\pi$) than 0 (modulo $\pi$); $\hat{\varphi}_{BB}$ being said estimate of the baseband signal and $s_{II}$, $s_{IQ}$, $s_{QI}$, $s_{QQ}$ being the first, second, third and fourth projection signals respectively.

10. The method of estimating the time of arrival according to claim 9, wherein it is determined if the phase of the RF signal is closer to 0 or $\pi/2$ (modulo $\pi$), by determining if an estimate of this phase by a third estimator:

$$\hat{\varphi}_{RF}^1 = \text{Arctan}\sqrt{\frac{s_{QI}^2 + s_{QQ}^2}{s_{IQ}^2 + s_{II}^2}}$$

is closer to 0 or $\pi/2$ (modulo $\pi$) $\pi/2$ respectively.

11. The method of estimating the time of arrival according to claim 9, wherein it is determined if the phase of the RF signal is closer to 0 or $\pi/2$ (modulo $\pi$), by determining if an estimate of this phase by a fourth estimator:

$$\hat{\varphi}_{RF}^2 = \pi/2 - \text{Arctan}\sqrt{\frac{s_{IQ}^2 + s_{II}^2}{s_{QI}^2 + s_{QQ}^2}}$$

is closer to 0 or $\pi/2$ (modulo $\pi$) respectively.

12. The method of estimating the time of arrival according to claim 1, wherein the phase of the baseband signal is estimated from:

$$\hat{\varphi}_{BB} = \pi/2 - \text{Arctan}\sqrt{\frac{s_{QI}^2 + s_{II}^2}{s_{IQ}^2 + s_{QQ}^2}}$$

where $s_{II}$, $s_{IQ}$, $s_{QI}$ are the first, second, third and fourth projection signals respectively.

13. The method of estimating the time of arrival according to claim 1, wherein the first estimate of the time of arrival $\hat{\tau}_{BB}$ of the UWB pulse is obtained from:

$$\hat{\tau}_{BB} = \tau_{window} + \Delta T \frac{\hat{\varphi}_{BB}}{2\pi}$$

where $\tau_{window}$ is the beginning of said time window, $\Delta T$ is the duration of said time window and $\hat{\varphi}_{BB}$ is said estimate of the phase of the baseband signal.

14. The method of estimating the time of arrival according to claim 13, wherein said integer is determined to minimise the absolute value of the difference between the first and second estimates of the time of arrival.

15. The method of estimating the time of arrival according to claim 1, wherein the second estimate of the time of arrival $\hat{\tau}_{RF}$ of the UWB pulse is obtained from:

$$\hat{\tau}_{RF} = \tau_{window} + T_0 \cdot \frac{\hat{\varphi}_{RF} - \gamma}{2\pi} + k\frac{T_0}{2}$$

where $\tau_{window}$ is the beginning of said time window, $T_0$ is a period of the carrier frequency, $\hat{\varphi}_{RF}$ is said estimate said estimate of the phase of the RF signal, k is a positive, negative or zero integer, and $\gamma$ is a phase shift obtained by calibration.

16. A receiver configured to estimate the time of arrival of a UWB pulse contained in an RF signal, said UWB pulse being modulated at a carrier frequency ($f_0$), the receiver comprising:
 circuitry configured to
  receive the RF signal and translate the signal thus received in baseband using a first mix in quadrature to provide a signal in phase ($s_I$) and a signal in quadrature ($s_Q$) with the signal of a first local oscillator, said signals in phase and in quadrature forming a baseband signal;
  project the signal in phase ($s_I$) onto a base composed of first and second periodic signals orthogonal to each other, to provide first and second projection signals respectively ($s_{II}, s_{IQ}$), said projection being made by means of a second mix in quadrature and an integration on a time window;

project the signal in quadrature ($s_Q$) onto said base, to provide third and fourth projection signals respectively ($s_{QI}$, $s_{QQ}$), said projection being done by means of a third mix in quadrature and an integration on said time window; and estimate a phase of the RF signal ($\phi_{RF}(\tau)$) relative to the signal of the first local oscillator and estimate a phase of the baseband signal ($\phi_{BB}(\tau)$) relative to the first/second periodic signal, based on the first, second, third and fourth projection signals, the time of arrival ($\hat{\tau}_{RF}$, $\hat{\tau}_{BB}$) of said pulse being obtained from the two phases thus estimated ($\hat{\phi}_{RF}(\tau)$, $\hat{\phi}_{BB}(\tau)$).

* * * * *